(12) United States Patent
Seo et al.

(10) Patent No.: US 7,898,144 B2
(45) Date of Patent: Mar. 1, 2011

(54) MULTI-STEP MICROACTUATOR PROVIDING MULTI-STEP DISPLACEMENT TO A CONTROLLED OBJECT

(75) Inventors: Cheong Soo Seo, Seongnam (KR); Gyoung Il Cho, Seoul (KR); Sang Hyune Baek, Suwon (KR)

(73) Assignees: Angstrom, Inc., Seongnam (KR); Stereo Display, Inc., Anaheim, CA (US)

( * ) Notice: Subject to any disclaimer, the term of this patent is extended or adjusted under 35 U.S.C. 154(b) by 660 days.

(21) Appl. No.: 11/347,590

(22) Filed: Feb. 4, 2006

(65) Prior Publication Data

US 2007/0182276 A1  Aug. 9, 2007

(51) Int. Cl.
*H02N 1/00* (2006.01)
*G02B 26/08* (2006.01)

(52) U.S. Cl. .................. 310/309; 359/224.1; 359/290

(58) Field of Classification Search ............ 310/309; 359/223–226, 290, 291, 295, 223.1, 224.1, 359/224.2, 225.1, 226.1, 226.2
See application file for complete search history.

(56) References Cited

U.S. PATENT DOCUMENTS

| | | | |
|---|---|---|---|
| 2,002,376 A | 5/1935 | Mannheimer | |
| 4,407,567 A | 10/1983 | Michelet | |
| 4,834,512 A | 5/1989 | Austin | |
| 5,004,319 A | 4/1991 | Smither | |
| 5,212,555 A | 5/1993 | Stoltz | |
| 5,369,433 A | 11/1994 | Baldwin | |
| 5,402,407 A | 3/1995 | Eguchi et al. | |
| 5,467,121 A | 11/1995 | Allcock | |
| 5,543,956 A * | 8/1996 | Nakagawa et al. | 359/225 |
| 5,612,736 A | 3/1997 | Vogeley et al. | |
| 5,696,619 A | 12/1997 | Knipe | |
| 5,881,034 A | 3/1999 | Mano | |
| 5,897,195 A | 4/1999 | Choate | |
| 5,986,811 A | 11/1999 | Wohlstadter | |
| 6,025,951 A | 2/2000 | Swart | |
| 6,028,689 A | 2/2000 | Michaliek | |
| 6,064,423 A | 5/2000 | Geng | |
| 6,084,843 A | 7/2000 | Abe | |
| 6,104,425 A | 8/2000 | Kanno | |
| 6,111,900 A | 8/2000 | Suzudo | |
| 6,123,985 A | 9/2000 | Robinson | |
| 6,147,856 A * | 11/2000 | Karidis | 361/277 |
| 6,282,213 B1 | 8/2001 | Gutin | |
| 6,833,938 B2 | 10/2001 | Nishioka | |
| 6,315,423 B1 | 11/2001 | Yu | |
| 6,329,737 B1 | 12/2001 | Jerman | |
| 6,900,901 B2 | 12/2001 | Harada | |
| 6,658,208 B2 | 8/2002 | Watanabe | |
| 7,023,466 B2 | 9/2002 | Favalora | |
| 6,498,673 B1 | 12/2002 | Frigo | |

(Continued)

FOREIGN PATENT DOCUMENTS

JP  08-043881  *  2/1996

(Continued)

*Primary Examiner* — Karl I Tamai

(57) ABSTRACT

A multi-step microactuator is provided with the multiple supports in a stepper plate to give multi-step displacement to a controlled object. The microactuator has advantages such that multiple motion can be applied to the controlled object and that the object can be controlled in a low driving voltage and that simple motion control is applied by digital controlling and that the degrees of freedom in motion of the object can be chosen by the number of the stepper plate and that only single voltage is needed for driving the micromirror motion. With many advantages, the multi-step microactuator provides a solution to overcome the difficulties in controlling multi-step motion.

26 Claims, 7 Drawing Sheets

U.S. PATENT DOCUMENTS

| | | |
|---|---|---|
| 6,507,366 B1 | 1/2003 | Lee |
| 6,625,342 B2 | 1/2003 | Staple |
| 6,650,461 B2 | 1/2003 | Atobe |
| 6,649,852 B2 | 2/2003 | Chason |
| 6,711,319 B2 | 3/2003 | Hoen |
| 6,549,730 B1 | 4/2003 | Hamada |
| 6,621,611 B2 * | 9/2003 | Gutierrez et al. ............. 359/223 |
| 6,885,819 B2 | 9/2003 | Shinohara |
| 6,738,177 B1 * | 5/2004 | Gutierrez et al. ............. 359/298 |
| 6,741,384 B1 | 5/2004 | Martin |
| 6,784,771 B1 | 8/2004 | Fan |
| 6,900,922 B2 | 8/2004 | Aubuchon |
| 6,906,848 B2 | 8/2004 | Aubuchon |
| 7,046,447 B2 | 5/2005 | Raber |
| 6,906,849 B1 | 6/2005 | Mi |
| 6,914,712 B2 | 7/2005 | Kurosawa |
| 6,919,982 B2 | 7/2005 | Nimura et al. |
| 6,934,072 B1 | 8/2005 | Kim |
| 6,934,073 B1 | 8/2005 | Kim |
| 7,077,523 B2 | 8/2005 | Seo |
| 6,944,247 B2 | 9/2005 | Lee |
| 6,952,304 B2 * | 10/2005 | Mushika et al. ............. 359/295 |
| 6,958,777 B1 | 10/2005 | Pine |
| 7,068,416 B2 | 10/2005 | Gim |
| 6,970,284 B1 | 11/2005 | Kim |
| 6,999,226 B2 | 12/2005 | Kim |
| 7,031,046 B2 | 12/2005 | Kim |
| 7,161,729 B2 | 12/2005 | Kim |
| 6,995,909 B1 | 2/2006 | Hayashi et al. |
| 7,068,415 B2 * | 6/2006 | Mushika ....................... 359/291 |
| 2002/0018407 A1 | 2/2002 | Komoto |
| 2002/0102102 A1 | 8/2002 | Watanabe |
| 2002/0135673 A1 | 9/2002 | Favalora |
| 2003/0058520 A1 | 3/2003 | Yu |
| 2003/0071125 A1 | 4/2003 | Yoo |
| 2003/0174234 A1 | 9/2003 | Kondo |
| 2003/0184843 A1 | 10/2003 | Moon |
| 2004/0009683 A1 | 1/2004 | Hiraoka |
| 2004/0012460 A1 | 1/2004 | Cho |
| 2004/0021802 A1 | 2/2004 | Yoshino |
| 2004/0052180 A1 | 3/2004 | Hong |
| 2004/0246362 A1 | 12/2004 | Konno |
| 2004/0252958 A1 | 12/2004 | Abu-Ageel |
| 2005/0024736 A1 | 2/2005 | Bakin |
| 2005/0057812 A1 | 3/2005 | Raber |
| 2005/0136663 A1 | 6/2005 | Terence Gan |
| 2005/0174625 A1 | 8/2005 | Huiber |
| 2005/0180019 A1 | 8/2005 | Cho |
| 2005/0212856 A1 | 9/2005 | Temple |
| 2005/0224695 A1 | 10/2005 | Mushika |
| 2005/0225884 A1 | 10/2005 | Gim |
| 2005/0231792 A1 | 10/2005 | Alain |
| 2005/0264870 A1 | 12/2005 | Kim |
| 2006/0012766 A1 | 1/2006 | Klosner |
| 2006/0012852 A1 | 1/2006 | Cho |
| 2006/0028709 A1 | 2/2006 | Cho |
| 2006/0187524 A1 | 8/2006 | Sandstrom |
| 2006/0209439 A1 | 9/2006 | Cho |
| 2007/0182276 A1 * | 8/2007 | Seo et al. ....................... 310/309 |

FOREIGN PATENT DOCUMENTS

| | | | |
|---|---|---|---|
| JP | 11-069209 | * | 3/1999 |
| JP | 2002-288873 | * | 10/2002 |

* cited by examiner

MULTI-STEP MICROACTUATOR PROVIDING MULTI-STEP DISPLACEMENT TO A CONTROLLED OBJECT

BACKGROUND OF THE INVENTION

The microactuators controlled by electrostatic force can be divided into discrete control or digital control and analogy control. Displacement made by analog control is determined at the equilibrium between electrostatic force and elastic force. Therefore, the microactuator with analogy control has continuous displacement through mechanical deformation. But, it is more complex than the digital or discrete control, and is not compatible with known semiconductor technologies such as MOS, CMOS, etc. In addition, the microactuators with continuous displacement actuated by electrostatic force undergo the classical snap-down phenomenon when the electric force exceeds the elastic force of mechanical structure. The snap-down phenomenon limits the displacement range of the microactuator. The high driving voltage is another disadvantage in use of the microactuator with continuous displacement actuated by electrostatic force. To be compatible with IC components, it is desired that a microactuator is operated at low voltage which is compatible with the circuit operation. In contrast, discrete control is simple, compatible with known semiconductor technologies such as MOS and CMOS and has a large displacement and low driving voltage. But, it is not easy to get a multi-step displacement with simple structure.

SUMMARY OF THE INVENTION

The present invention provides an advanced microactuator for multi-step position control of an object. The microactuator has many advantages for controlling multi-step position such as that the microactuator uses simple driving method, and that single voltage or discretely separated voltage source is used for multi-step position control.

In the present invention, multi-step microactuator is provided. The microactuator comprises at least one stepper plate with a plurality of supports, which are introduced for multi-step position control. The stepper plate is inclined by electrostatic force between the electrodes and the stepper plate. When a stepper plate is inclined for a given step toward the selected direction, the pre-programmed position of the support provides a displacement to an object. For example, the support can uphold the micromirror to make a desired motion of the micromirror. Each support on a stepper plate gives a pre-programmed displacement to the micromirror. The displacement amount can be determined by in-plane position of support on stepper plate and different amounts of the rotation angle of the stepper plates for each step. The control system is actuated by the electrostatic force between the stepper plate and the electrodes. Also the electromagnetic and electrothermal forces can be applied to the system.

The shape of the stepper plates can be varied to have triangular, square, hexagonal, octagonal, circular or other shapes. The number of the steps in a stepper plate can be determined by the shape of the stepper plate and the electrodes under the stepper plates. If the stepper plate has 8 electrodes, the stepper plates can have up to 8 different steps.

The control system needs low voltage to control the microactuator by sharing the multiple electrodes. Since defining of a step is only determined by the direction of the inclined stepper plate and the support position, one step in a stepper plate can share neighboring electrodes to have stronger electrostatic force. By using the multiple electrodes together, the driving voltage can be reduced since the effective area for forming the electrostatic force is increased. Electrostatic force can be increased by doubled or tripled the area of the electrode by applying the driving voltage to the on-step electrode accompanying with neighboring electrodes. By applying the voltage to the multiple electrodes together, the stepper plate with supports can give large actuating force. Each step is controlled by the corresponding electrode or electrodes.

Still another advantage is that the object controlled by N number of microactuators has N degrees of freedom in motion control. The degrees of the freedom can be varied by adding more microactuators to obtain the desired degrees of freedom in the object. When the stepper plate is inclined, a support gives the unique displacement to the controlled object. If the object needs three degrees of freedom motions, three different microactuators are controlled to define the desire motion of the controlled object. The three degrees of freedom motion of the object requires at least three microactuators.

The multi-step microactuator of the present invention has advantages: (1) multiple displacement control is possible; (2) the microactuator can be controlled in a low driving voltage; (3) simple displacement control is applied by digital controlling; (4) the degrees of freedom in motion of the object can be chosen by the number of the microactuators; (5) only single voltage is needed for driving the microactuator; and (6) the microactuator is controlled in a stepwise way.

Although the present invention is briefly summarized, the full understanding of the invention can be obtained by the following drawings, detailed description, and appended claims.

DESCRIPTION OF THE FIGURES

These and other features, aspects and advantages of the present invention will become better understood with reference to the accompanying drawings, wherein.

DETAILED DESCRIPTION OF THE INVENTION

Figure 1:
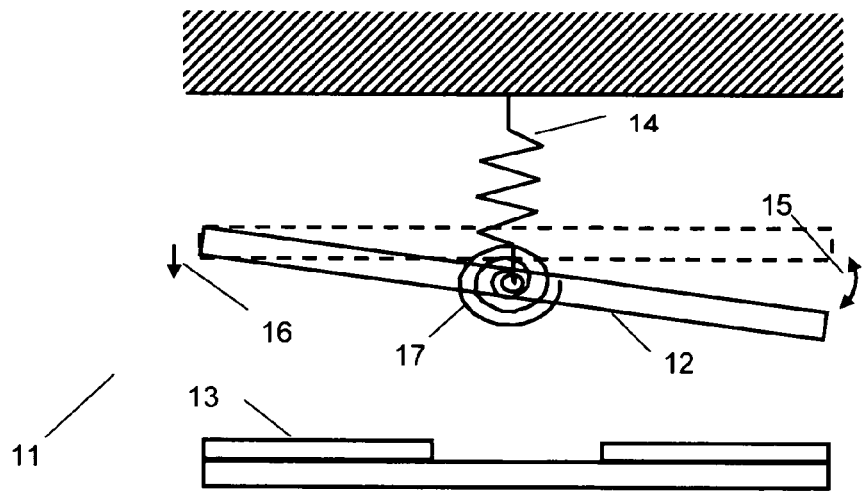
FIG. 1 shows schematic diagram of a microactuator system giving continuous displacement to the object.

FIG. 1 shows schematic diagram of a microactuator system 11 giving continuous displacement to the object 12. The object 12 is controlled to have a continuous rotation 15 or translation 16, which is determined by the equilibrium between electrostatic force between the electrode 13 and the object 12 and elastic force of the translational spring 14 and the rotational spring 17. The object 12 is rotated along the hinge supported by the supporting structure. Since the displacement is determined by the equilibrium of the electrostatic and elastic forces, complex analog control with active feedback is required to have a fine control of the motion.

On the other hand, the multi-step microactuator has simpler control system. Once the motion is defined and programmed in the microactuator, the control is just applying the on/off voltage for desired channel with respect to the desired motion. No feedback is required and the motion is reproducible regardless of the environment.

The multi-step microactuator comprises a stepper plate with multiple supports, coupled to the bottom layer, configured to rotate, a bottom layer configured to have multiple electrodes to control the stepper plate. A controlled object is coupled to the stepper plate wherein the microactuator gives the multiple displacements to the controlled object. The displacement is programmed by the positions of the supports or the rotation angles of the stepper plate.

Figure 2:
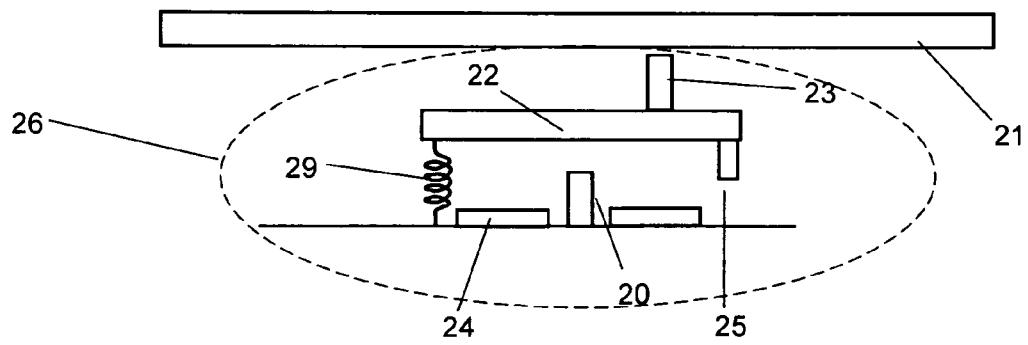
FIG. 2 shows components of microactuator according to embodiments of the present invention.

FIG. 2 shows components of microactuator 26 according to embodiments of the present invention. The microactuator includes stepper plates 22 with multiple supports 23, coupled to the bottom layer 27 and configured to be rotated to give displacement of the object 21, and a bottom layer 27 configured to have multiple electrodes 24 to control the stepper plate 22, and the object 21 coupled to the stepper plate 22. Also the microactuator can use different types of stops 20, 25 to control the displacement of the object. The microactuator 21 has the multiple motions programmed by the positions of the supports 23 or the rotation angles of the stepper plate 22. The stepper plates are restored due to the restoring forces by the flexible springs 29. The stop 25 under the stepper plate 22 adjusts the amount of the angle rotated by its position and/or its height. Also the stop 20 at the bottom layer 27 adjusts the amount of the angle rotated by its position and/or its height.

Figure 3A:
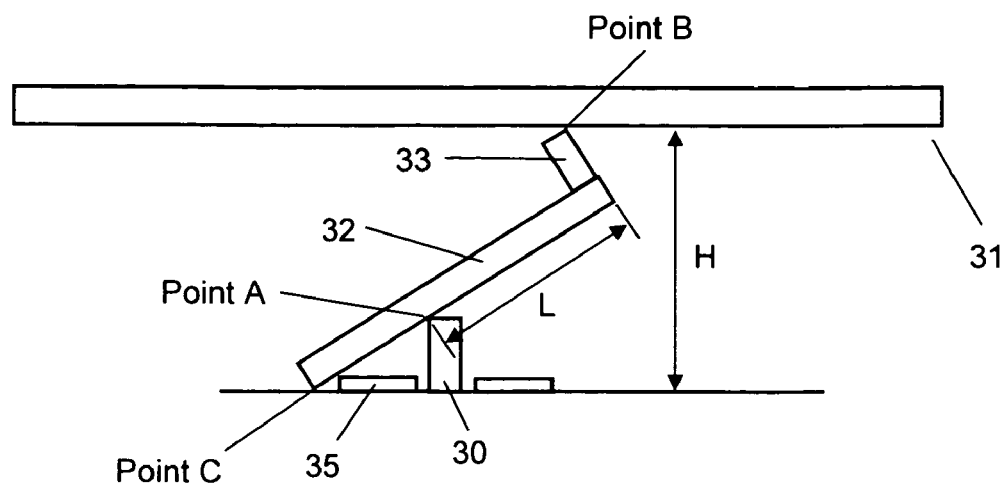
FIGS. 3A-3B show actuation of the microactuator.

In FIG. 3A, the motion defined by the support 33 on the stepper plate 32 is described. The stepper 32 structure is coupled to the bottom layer 27 with electrodes 35. Each electrode 35 is activated for a given desired motion of the object 31. The supports 33 on the stepper plate 32 are positioned for defining the position of an object 31. The height H of the support 33 after the stepper plate is rotated is varied by the distance L from contact point A. The motion of the controlled object 31 is defined by contact position B of the supports 33 after the stepper plate 32 is rotated. More than one support can uphold the object 31. Two contact points A and C determine the amount of angle of stepper plate, where contact point A is determined by height and position of stop 30. The stops 30 can be used alone or the combinations of the stops 30, 25 can be used. Electrodes 35 pull the stepper plate 32 until the two contact points A, C blocks the rotation of the stepper plate 32. The motion of the object 31 is defined by the positions of supports on the stepper plate 32, or the rotation angle limited by the stops under the stepper plates 25. The stop 30 in the middle of the stepper plate also defines the stepper plate 32. The support 33 on the stepper plate 32 pushes the object 31 to have the desired motion of the object. The opposite side electrode 35 is applied by the driving voltage. The displacements of the object 31 controlled by the microactuator are obtained by the supports 33 with respect to the inclination direction of the stepper plate.

Figure 3B:
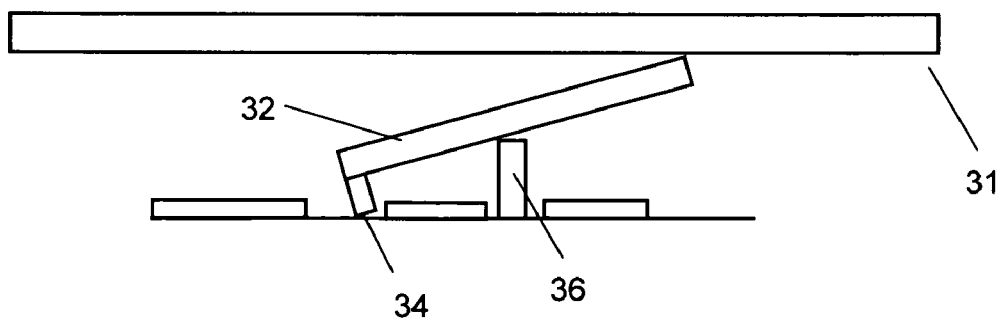

FIG. 3B shows the motion obtained by the stops 34 under the stepper plate 32. In the figure, a stepper plate has the stop 34 under the stepper plate 32. The amounts of the rotation angles are different as the stop position or the height of the stop or even the existence of the stop under the stepper plate. Also the stop can be existed on the bottom layer 27 and can define the stepper 32 rotation angle thus the motion of the object 31. While the rotation amount of the stepper is defined, the inside stops 36 plays a role as a motion control point to define a plane for the stepper plate 32. And the stepper plate 32 or the support 33 on the stepper plate moves the object 31. The motion of the object is defined by the rotation amounts of the stepper plate 32 which is determined by the height and/or the position of the stops 34, 36.

Figure 4:
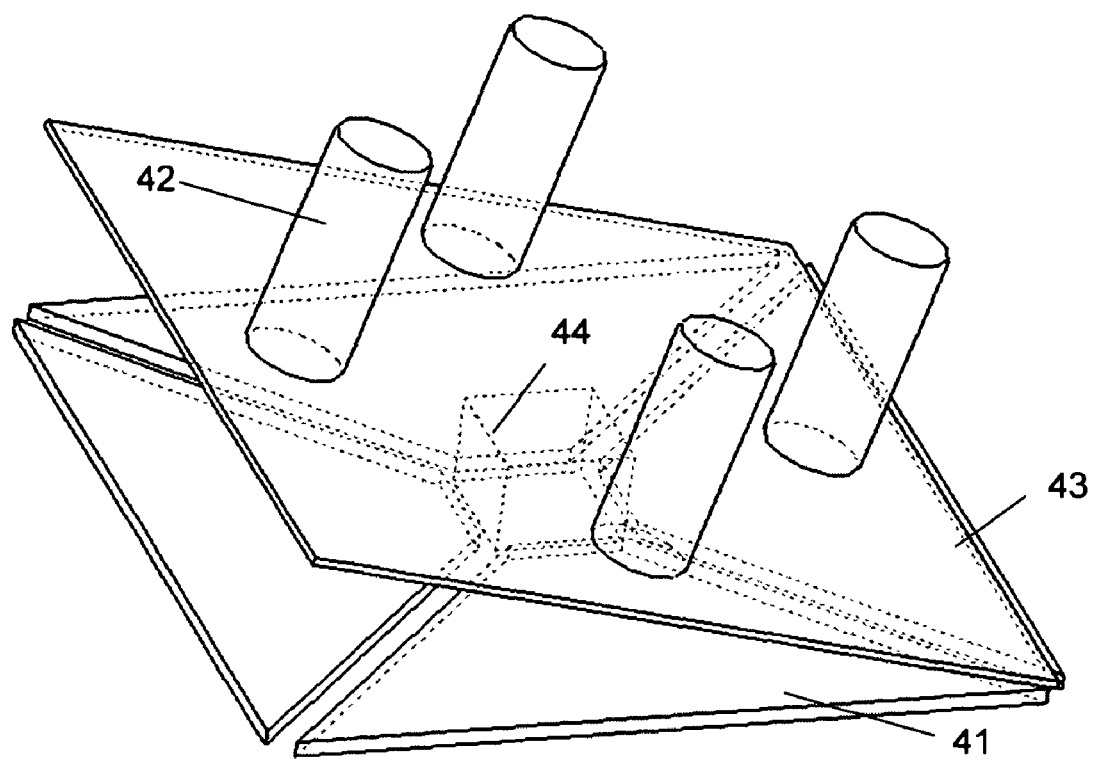
FIG. 4 shows a stepper plate with quadruple supports and electrodes for generating the multiple motions (4 different motions)

FIG. 4 shows a stepper plate 43 with four supports on a stepper plate 43 and electrodes 41 for generating four different motions. If the voltage is applied on one of the electrode 41, the stepper plate 43 is inclined and snapped down to the direction of the voltage applied electrode 41. Then the support 42 in opposite side is rotated and raises its tip position by the inclination of the stepper plate 43. The raised support 42 moves the object (not shown) to the desired position. Since there are four electrodes, the stepper plate 43 is inclined to the corresponding directions of the electrodes 41. For each inclination direction, the position of the support 42 is determined for generating the desired motion of the object. The position and the height of the support 42 is determined to have the pre-programmed motions and fabricated during making process of the microactuator system. To have larger electrostatic force or lower driving voltage, electric bias can be applied to two or three electrodes at the same time. Since the area of the electrode is doubled or tripled, the electrostatic force becomes larger than that of one electrode case. Different support in a stepper plate gives different motion.

Figure 5:
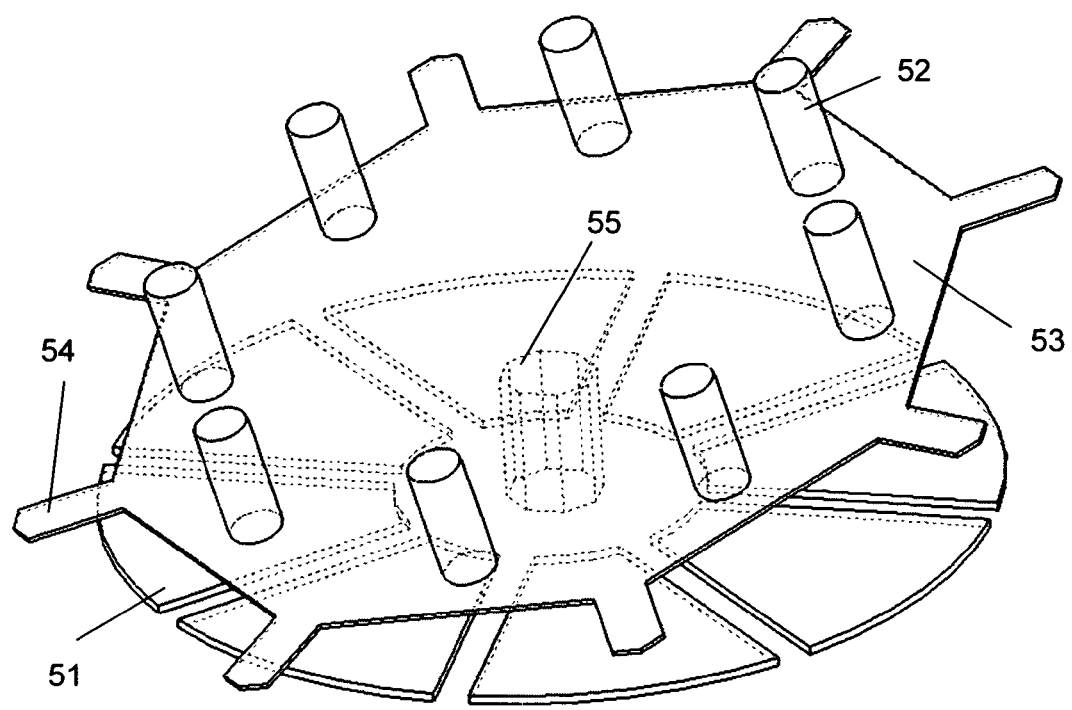
FIG. 5 shows a stepper plate with multiple supports and electrodes for generating the multiple motions (8 different motions)

FIG. 5 shows an 8 steps microactuator. Eight supports and electrodes 51 for generating eight different heights for generating motions. If the voltage is applied on one of the eight electrodes 51, the stepper plate 52 is inclined and snapped down to the direction of voltage applied electrode 51. Then the support 52 in opposite side is raised by the inclination of the stepper plate 52. The raised support 52 moves the object (not shown) to the desired position. Since there are eight electrodes, the stepper plate is inclined to the corresponding directions of the electrodes. For each inclination direction, the position of the support 52 is determined for generating the desired motion of the object. Also to have larger electrostatic force or lower driving voltage, electric bias can be applied to multiple electrodes at the same time. Since the area of the electrode 51 is increased, the electrostatic force becomes larger than that of one electrode case. The system has multiple motions which are constraint by the number of the supports in the stepper plates 53. Since the stepper plate contacts the bottom layer structure, the stiction can prevent the stepper motion. To reduce the possible stiction problem, the tip 54 on the stepper plate is applied to minimize the contact area.

Figure 6:
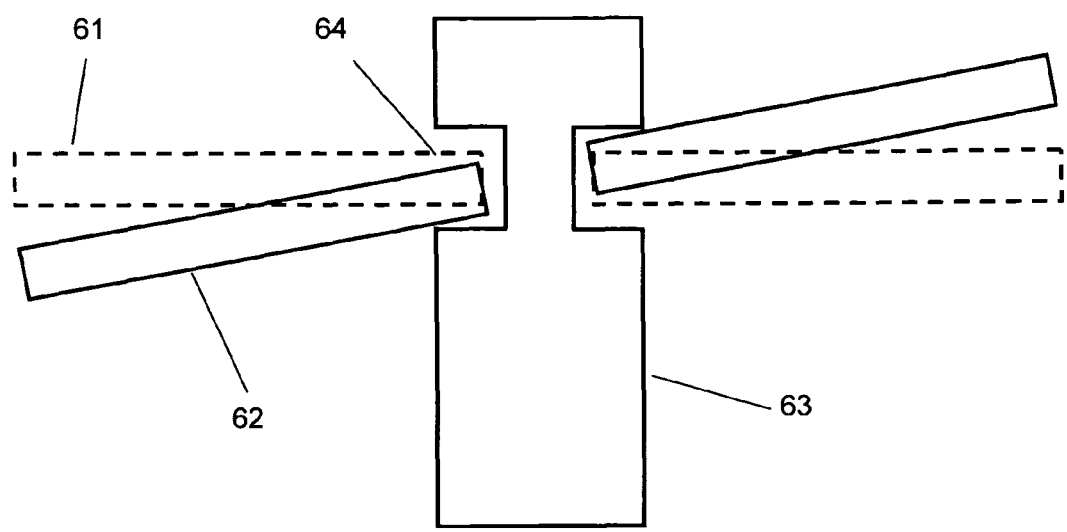
FIG. 6 is a schematic diagram of springless hinge structure.

FIG. 6 is a schematic diagram of springless hinge structure. The stepper plate 61 is attached to a flexible spring, and the flexible spring is attached to a fixed structure at FIG. 2 . But the spring can be omitted by using hinge structure as FIG. 6. The stepper plate 62 is confined in the hinge structure 63, while the stepper plate 62 has a motion with inclination.

Figure 7:
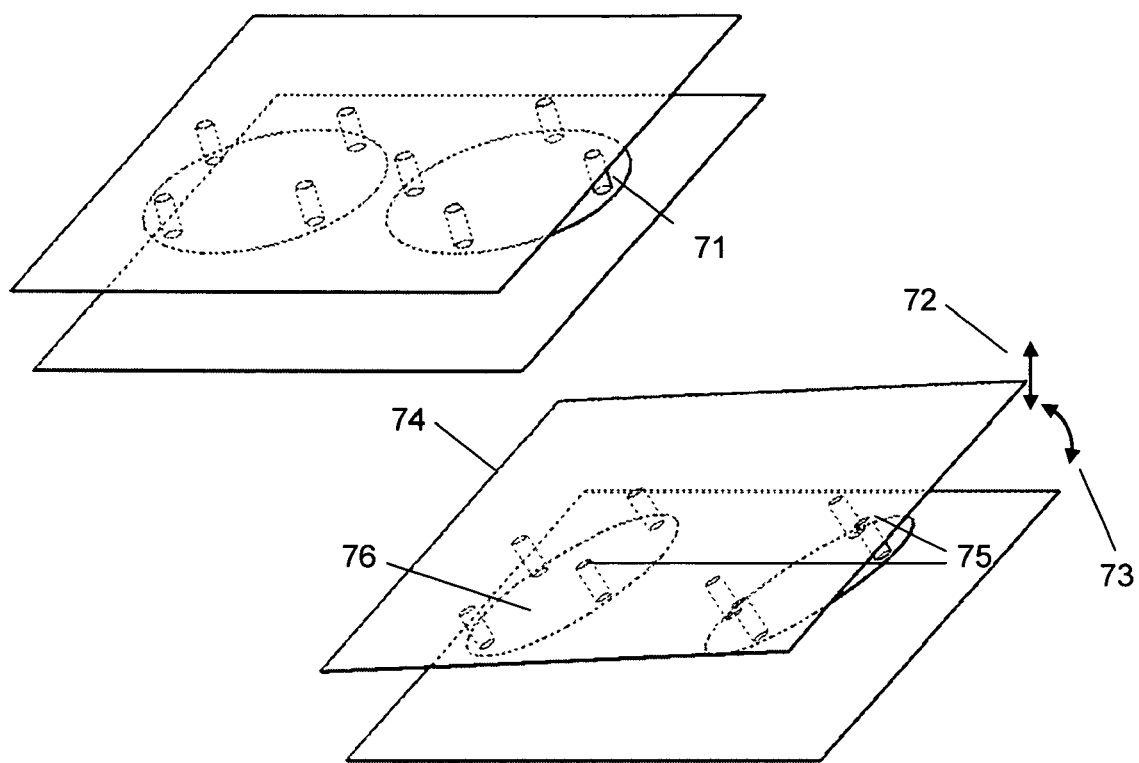
FIG. 7 is a schematic diagram showing how two microactuators define the controlled object motions with two degrees of freedom (one rotational and one translational)

FIG. 7 shows how two microactuators 76 define object motions 72, 73 with two degrees of freedom. The figure shows one rotational 73 and one translational 72 degrees of freedom case. Two supports 75 from different stepper plates 76 define the motion of the object 74. In addition to the rotational motion of the object 74, the translation 72 of the object 74 can be 25 adjusted by the supports 75. The object 74 motion 72, 73 is defined by the two heights of the supports 75 which are determined by the rotation angle of the stepper plate 76 and the distance from the steppercenter to the corresponding support 75.

Figure 8:
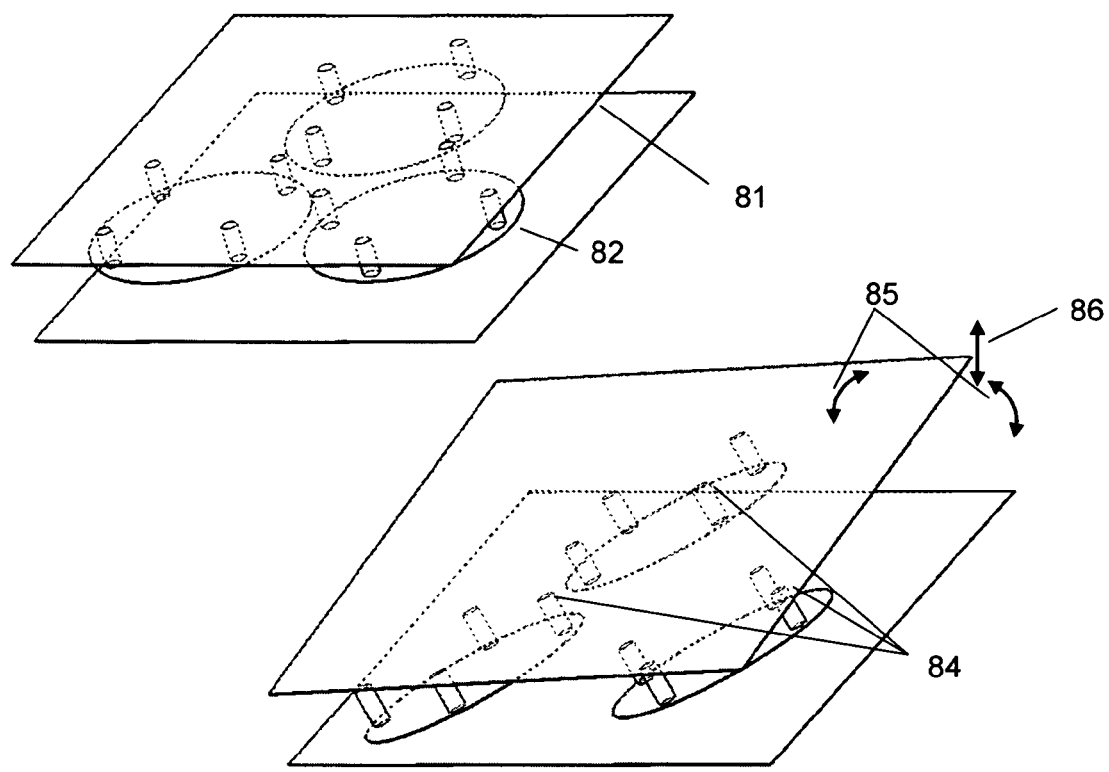
FIG. 8 is a schematic diagram showing how three microactuators define object motions with three degrees of freedom (two rotational and one translational)

In FIG. 8, configuration with three degrees of freedom 85, 86 is presented. The motion has two degrees of freedom rotation 85 and one degree of translation 86. For representing three degrees of freedom motion, at least three supports 84 are needed from different stepper plates 82. Height and position of each support 84 from three stepper plates 82 defines a specific motion in three dimensional space. These three points by the three supports 84 make a plane for the object 81 representing object motion. Every motion can be specified as a step. In a step, three supports 84 from different stepper plate 82 define a plane of motion. In the same way, three other positions by the three other supports define another plane for the object 81. As many planes as the numbers of the supports in a stepper plate 82 can be defined by three stepper plates 82.

While the invention has been shown and described with reference to different embodiments thereof, it will be appreciated by those skills in the art that variations in form, detail, compositions and operation may be made without departing from the spirit and scope of the invention as defined by the accompanying claims.

What is claimed is:

1. A multi-step microactuator comprising:
   a. at least three stepper plates configured to control three degrees of freedom motion of an object, wherein each stepper plate has a plurality of supports thereon and is configured to have a plurality of rotations, wherein each rotation of each stepper plate makes at least one of the supports of the stepper plate contact the object; and
   b. a bottom layer having a plurality of electrodes and at least one stop for each stepper plate to control the rotation of the stepper plate, wherein the rotations of the stepper plates are determined by activated electrodes, wherein the rotated stepper plate is configured to contact the bottom layer and the stop for the stepper plate;
   wherein the three degrees of freedom motion of the object is controlled by the rotations of at least three of the stepper plates activated by the electrodes, which makes the three supports of the rotated stepper plates contact the object to determine the three degrees of freedom motion of the object.

2. The multi-step microactuator of claim 1, wherein the stepper plate is controlled by electrostatic force.

3. The multi-step microactuator of claim 2, wherein the stepper plate and the bottom layer have same potential.

4. The multi-step microactuator of claim 1, wherein the microactuator gives the three degrees of freedom motion to the object programmed by the rotations of the stepper plates.

5. The multi-step microactuator of claim 1, wherein the three degrees of freedom motion of the object is programmed by the positions of the supports on the stepper plates.

6. The multi-step microactuator of claim 1, wherein the three degrees of freedom motion of the object is programmed by the heights of the supports.

7. The multi-step microactuator of claim 1, wherein the three degrees of freedom motion of the object includes one rotational degree of freedom.

8. The multi-step microactuator of claim 1, wherein the three degrees of freedom motion of the object includes one translational degree of freedom.

9. The multi-step microactuator of claim 1, wherein the three degrees of freedom motion of the object includes one rotational degree of freedom and one translational degree of freedom.

10. The multi-step microactuator of claim 1, wherein the three degrees of freedom motion of the object includes two rotational degrees of freedom.

11. The multi-step microactuator of claim 1, wherein the three degrees of freedom motion of the object includes two rotational degrees of freedom and one translational degree of freedom.

12. The multi-step microactuator of claim 1, wherein the three degrees of freedom motion of the object is programmed in the geometry of the stepper plates and the supports while fabricating the microactuator.

13. The multi-step microactuator of claim 1, wherein each stepper plate comprise at least one stop disposed under the stepper plate, wherein the three degrees of freedom motion of the object is defined by the rotations of the stepper plate constraint by the position and the height of the stop under the stepper plate.

14. The multi-step microactuator of claim 1, wherein the three degrees of freedom motion of the object is defined by the rotations of the stepper plates constraint by the positions and the heights of the stops of the bottom layer.

15. The multi-step microactuator of claim 1, wherein each stepper plate has multi-stable positions.

16. The multi-step microactuator of claim 15, wherein each stable position of the stepper plate is controlled by the corresponding electrode or electrodes.

17. The multi-step microactuator of claim 15, wherein each stable position of the stepper plate is controlled by the multiple electrodes.

18. The multi-step microactuator of claim 17, wherein the use of the multiple electrodes reduces the driving voltage of the microactuator.

19. The multi-step microactuator of claim 1, wherein the multi-step microactuator is actuated by electrostatic force between the stepper plate and the electrodes.

20. The multi-step microactuator of claim 1, wherein the multi-step microactuator is actuated by electromagnetic or by electro-thermal forces.

21. The multi-step microactuator of claim 1, wherein each stepper plate has a tip structure to reduce the contact area of the Stepper plate.

22. The multi-step microactuator of claim 21, wherein the tip structure reduces possible stiction problem.

23. The multi-step microactuator of claim 21, wherein the tip structure makes the stepper plate can have fine motion control.

24. The multi-step microactuator of claim 1, wherein each stepper plate can have a springless hinge structure.

25. The multi-step microactuator of claim 1, wherein each stepper plate has multi-directional rotation for multi-step actuation.

26. The multi-step microactuator of claim 25, wherein the shape of the stepper plate is a polygon such as square, rectangle, hexagon and octagon, wherein the number of steps in each stepper plate is determined by the shape of the stepper plate and the number of the electrodes under the stepper plate.

* * * * *